US008257810B2

(12) United States Patent
Wu et al.

(10) Patent No.: US 8,257,810 B2
(45) Date of Patent: *Sep. 4, 2012

(54) CORE SHELL HYDROPHOBIC INTERMEDIATE TRANSFER COMPONENTS

(76) Inventors: Jin Wu, Webster, NY (US); Lanhui Zhang, Webster, NY (US); Lin Ma, Webster, NY (US); Brian Gilmartin, Williamsville, NY (US)

( * ) Notice: Subject to any disclaimer, the term of this patent is extended or adjusted under 35 U.S.C. 154(b) by 670 days.

This patent is subject to a terminal disclaimer.

(21) Appl. No.: 12/431,829

(22) Filed: Apr. 29, 2009

(65) Prior Publication Data

US 2010/0279094 A1 Nov. 4, 2010

(51) Int. Cl.
*B32B 1/00* (2006.01)
*G03G 15/01* (2006.01)
*G03G 15/20* (2006.01)

(52) U.S. Cl. ..................... 428/36.4; 428/34.4; 428/36.6; 399/302; 399/308; 399/313

(58) Field of Classification Search ................. 428/34.1, 428/34.4, 34.6, 34.7, 35.7, 36.4, 36.6, 36.8, 428/36.9, 36.91, 421, 447; 399/302, 308, 399/313

See application file for complete search history.

(56) References Cited

U.S. PATENT DOCUMENTS 5,876,636 A 3/1999 Schlueter, Jr. et al.
5,922,440 A 7/1999 Schlueter, Jr. et al.
5,995,796 A 11/1999 Schlueter, Jr. et al.
6,397,034 B1 5/2002 Tarnawskyj et al.
6,602,156 B2 8/2003 Schlueter, Jr.
7,031,647 B2 4/2006 Mishra et al.
7,081,234 B1 * 7/2006 Qi et al. .................... 423/592.1
7,130,569 B2 10/2006 Goodman et al.
7,139,519 B2 11/2006 Darcy, III et al.
7,280,791 B2 10/2007 Goodman et al.
7,985,464 B2 * 7/2011 Wu .............................. 428/206
2006/0167138 A1 * 7/2006 Ishii et al. .................... 523/200

OTHER PUBLICATIONS

Machine Translation of Iwamoto et al., JP 11-115117 A, Apr. 1999.*
ChemicalBook, "Hexamethyldisilazane", http://www.chemicalbook.com/ChemicalProductProperty_EN_CB9105784.htm, retrieved Nov. 25, 2011, pp. 1-3.*
Zhang et al., "Microstructure and electrical properties of antimony-doped tin oxide thin film deposited by sol-gel process", Materials Chemistry and Physics, vol. 98, Issues 2-3, Aug. 1, 2006, pp. 353-357.*
U.S. Appl. No. 12/511,160.*
Jin Wu, U.S. Appl. No. 12/181,354, filed Jul. 29, 2008 on Treated Carbon Black Intermediate Transfer Components.
Jin Wu, U.S. Appl. No. 12/181,409, filed Jan. 27, 2009 on Nano Diamond Containing Intermediate Transfer Members.
May 24, 2011 European Search Report issued in EP 10 15 9753.

* cited by examiner

*Primary Examiner* — Walter B Aughenbaugh
(74) *Attorney, Agent, or Firm* — Eugene O. Palazzo

(57) ABSTRACT

An intermediate transfer belt that includes a core shell component wherein the core is, for example, comprised of a metal oxide, and the shell is comprised of silica, and which shell contains or includes a hydrophobic agent.

20 Claims, No Drawings

CORE SHELL HYDROPHOBIC INTERMEDIATE TRANSFER COMPONENTS

CROSS REFERENCE TO RELATED APPLICATIONS

Illustrated in U.S. application Ser. No. 12/181,409, now U.S. Pat. No. 7,738,824, filed Jul. 29, 2008, entitled Treated Carbon Black Intermediate Transfer Components, the disclosure of which is totally incorporated herein by reference, is an intermediate transfer member comprised of a substrate comprising a poly (vinylalkoxysilane) surface treated carbon black.

Illustrated in U.S. application Ser. No. 12/181,354, now U.S. Pat. No. 7,985,464, filed Jul. 29, 2008, entitled Core Shell Intermediate Transfer Components, the disclosure of which is totally incorporated herein by reference, is an intermediate transfer belt comprised of a substrate comprising a conductive core shell component.

BACKGROUND

Disclosed are intermediate transfer member, and more specifically, intermediate transfer members useful in transferring a developed image in an electrostatographic, for example xerographic, including digital, image on image, and the like, printers, machines or apparatuses. In embodiments, there are selected intermediate transfer members comprised of a core shell component comprised of a metal oxide core and a silica shell, and intermediate transfer members comprised of a core shell component, and which shell is hydrophobically treated with a silazane, and more specifically, a core comprised of a metal oxide and a silica shell, and where the shell has added thereto a silazane, and also where the resulting hydrophobized core shell component possesses a number of advantages such as excellent resistivity, a hydrophobic surface enabling excellent image transfer and acceptable scratch resistance, and excellent electrical and dimensional stability because of, for example, the members water repelling characteristics.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and colorant, which are commonly referred to as toner. Generally, the electrostatic latent image is developed by bringing a developer mixture into contact therewith. The developer mixture can comprise a dry developer mixture, which usually comprises carrier granules having toner particles adhering triboelectrically thereto, or a liquid developer material, which may include a liquid carrier having toner particles, dispersed therein. The developer material is advanced into contact with the electrostatic latent image, and the toner particles are deposited thereon in image configuration. Subsequently, the developed image is transferred to a copy sheet. It is advantageous to transfer the developed image to a coated intermediate transfer web, belt or component, and subsequently transfer with a high transfer efficiency the developed image from the intermediate transfer member to a permanent substrate. The toner image is subsequently usually fixed or fused upon a support, which may be the photosensitive member itself, or other support sheet such as plain paper.

In electrostatographic printing machines wherein the toner image is electrostatically transferred by a potential difference between the imaging member and the intermediate transfer member, the transfer of the toner particles to the intermediate transfer member and the retention thereof should be substantially complete so that the image ultimately transferred to the image receiving substrate will have a high resolution. Substantially 100 percent toner transfer occurs when most or all of the toner particles comprising the image are transferred, and little residual toner remains on the surface from which the image was transferred.

Intermediate transfer member advantages include enabling high throughput at modest process speeds, improving registration of the final color toner image in color systems using synchronous development of one or more component colors using one or more transfer stations, and increasing the range of final substrates that can be used. However, a disadvantage of using an intermediate transfer member is that a plurality of transfer steps is usually needed allowing for the possibility of charge exchange occurring between toner particles and the transfer member which ultimately can lead to less than complete toner transfer. This results in low resolution images on the image receiving substrate and also image deterioration. When the image is in color, the image can additionally suffer from color shifting and color deterioration with a number of transfer stops.

In embodiments, the resistivity of the intermediate transfer member is within a range to allow for sufficient transfer. It is also desired that the intermediate transfer member have a controlled resistivity, wherein the resistivity is virtually unaffected by changes in humidity, temperature, bias field, and operating time. In addition, a controlled resistivity is of value so that a bias field can be established for electrostatic transfer. Also, it is of value that the intermediate transfer member not be too conductive as air breakdown can possibly occur.

In U.S. Pat. No. 6,397,034, there is disclosed the use of a fluorinated carbon filler in a polyimide intermediate transfer member layer. However, there are disadvantages associated with these members such as undissolved particles frequently bloom or migrate to the surface of the polymer layer which leads to nonuniform resistivity characteristics, which in turn causes poor antistatic properties and poor mechanical strength. Also, the ionic additives present on the surface of the belt may interfere with toner release, and bubbles may appear in the conductive polymer layer, some of which can only be seen with the aid of a microscope, others of which are large enough to be observed with the naked eye, resulting in poor or nonuniform electrical properties and poor mechanical properties.

In addition, the ionic additives themselves are sensitive to changes in temperature, humidity, and operating time. These sensitivities often limit the resistivity range. For example, the resistivity usually decreases by up to two orders of magnitude or more as the humidity increases from about 20 percent to 80 percent relative humidity. This effect limits the operational or process latitude of the intermediate transfer member.

Therefore, it is desired to provide an intermediate transfer member inclusive of a weldable intermediate transfer belt, which has excellent transfer ability. It is also desired to provide a weldable intermediate transfer belt that is free of puzzle cut seams, but instead has a weldable seam, thereby providing a belt that can be manufactured without such labor intensive steps as manually piecing together the puzzle cut seam with ones fingers, and the lengthy high temperature and high humidity conditioning steps. It is also desired to provide an acceptable circumference weldable belt for color reproduction machines.

REFERENCES

Illustrated in U.S. Pat. No. 7,130,569 is a weldable intermediate transfer belt comprising a substrate comprising a homogeneous composition comprising a polyaniline in an amount of from about 2 to about 25 percent by weight of total solids, and a thermoplastic polyimide present in an amount of from about 75 to about 98 percent by weight of total solids, wherein the polyaniline has a particle size of from about 0.5 to about 5.0 microns.

Also referenced are U.S. Pat. No. 7,031,647, which illustrates an intermediate transfer belt, comprising a belt substrate comprising primarily at least one polyimide polymer; and a welded seam; and U.S. Pat. No. 7,139,519, which illustrates an image forming apparatus for forming images on a recording medium comprising:

a charge-retentive surface to receive an electrostatic latent image thereon;

a development component to apply toner to the charge-retentive surface to develop the electrostatic latent image to form a developed toner image on the charge retentive surface;

an intermediate transfer member to transfer the developed toner image from the charge retentive surface to a copy substrate, wherein the intermediate transfer member comprises a substrate comprising a first binder and lignin sulfonic acid doped polyaniline dispersion; and a fixing component to fuse the developed toner image to the copy substrate.

In U.S. Pat. No. 7,280,791 there is illustrated a weldable intermediate transfer belt comprising a substrate comprising a homogeneous composition comprising polyaniline in an amount of from about 2 to about 25 percent by weight of total solids, and thermoplastic polyimide in an amount of from about 75 to about 98 percent by weight of total solids, wherein the polyaniline has a particle size of from about 0.5 to about 5 microns.

The use of a polyaniline filler in a polyimide has been disclosed in U.S. Pat. No. 6,602,156. This patent discloses, for example, a polyaniline filled polyimide puzzle cut seamed belt.

SUMMARY

Included within the scope of the present disclosure is an intermediate transfer belt comprised of a substrate comprising a core shell component, and wherein the core is comprised of a metal oxide and the shell is comprised of silica; a hydrophobic intermediate transfer media comprised of a metal oxide core and a silica shell thereover, and wherein the shell includes a trialkyl-N-(trialkylsilyl)-silanamine; an intermediate transfer member comprised of a metal oxide core, and thereover a shell comprised of a silica wherein the silica shell further includes a hydrophobic additive, and wherein the metal oxide is titanium oxide, zinc oxide, tin oxide, aluminum zinc oxide, antimony titanium dioxide, antimony tin oxide, indium oxide, indium tin oxide, or mixtures thereof; an intermediate transfer belt, and intermediate members other than belts comprised of a substrate comprising a core shell component, and more specifically, a hydrophobized core shell where the core is comprised, for example, of a metal oxide, and the shell is comprised of a modified silica shell; an intermediate transfer media comprised of a substrate comprising a core and a shell thereover, and wherein the shell is comprised of a silazane containing silica, and which core shell possesses a B.E.T. surface area of from about 30 to about 100 $m^2/g$, and an apparatus for forming images on a recording medium comprising a charge retentive surface to receive an electrostatic latent image thereon; a development component to apply toner to the charge retentive surface to develop the electrostatic latent image, and to form a developed image on the charge retentive surface; and an intermediate transfer belt for transfer of the developed image from the charge retentive surface to a substrate, wherein the intermediate transfer belt comprises a conductive core shell component thereover, wherein the shell is selected from the group consisting of a number of suitable silicas, and which shell contains a hydrophobic substance, such as a silazane and the like, and the core is comprised of a metal oxide.

In addition, the present disclosure provides, in embodiments, an apparatus for forming images on a recording medium comprising a charge retentive surface to receive an electrostatic latent image thereon; a development component to apply toner to the charge retentive surface to develop the electrostatic latent image and to form a developed image on the charge retentive surface; a weldable intermediate transfer belt to transfer the developed image from the charge retentive surface to a substrate, wherein the intermediate transfer belt is as illustrated herein; and a fixing component.

EMBODIMENTS

In embodiments, the core shell component is comprised of a metal oxide core and a shell in which the shell is a silica, or the like, and further where the shell is hydrophobized with a silazane, a fluorosilane, a polysiloxane, and the like. In embodiments, the metal oxide or doped metal oxide may be selected from the group consisting of titanium oxide, zinc oxide, tin oxide, aluminum doped zinc oxide, antimony doped titanium dioxide, antimony doped tin oxide, indium oxide, indium tin oxide, similar doped oxides, and mixtures thereof.

Specific silazane examples are hexamethyldisilazane[1,1,1-trimethyl-N-(trimethylsilyl)-silanamine], 2,2,4,4,6,6-hexamethylcyclotrisilazane, 1,3-diethyl-1,1,3,3-tetramethyldisilazane, 1,1,3,3-tetramethyl-1,3-diphenyldisilazane, and 1,3-dimethyl-1,1,3,3-tetraphenyldisilazane, represented by the following structures/formulas

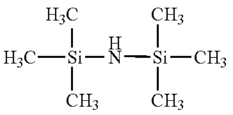
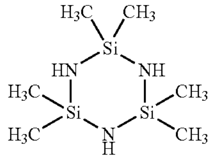
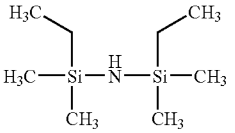
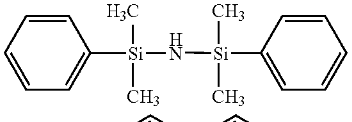
and
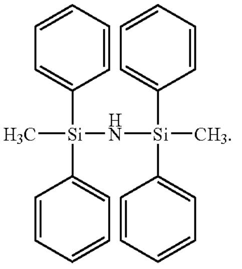

Specific fluorosilane examples are $C_6F_{13}CH_2CH_2OSi(OCH_3)_3$, $C_8H_{17}CH_2CH_2OSi(OC_2H_5)_3$, and the like, and mixtures thereof.

Specific polysiloxane examples are 2,4,6,8-tetramethylcyclotetra siloxane, 2,4,6,8,10-pentamethylcyclopentasiloxane, octamethylcyclotetrasiloxane, decamethylcyclopentasiloxane, 2,4,6-trimethyl-2,4,6-triphenylcyclotrisiloxane, hexaphenylcyclotrisiloxane, octaphenylcyclotetrasiloxane, and the like, and mixtures thereof. A specific example of the core shell is designated as VP STX801 (B.E.T. surface area=40 to 70 $m^2/g$), commercially available from EVONIK Industries, Frankfurt, Germany. The VP STX801 filler comprises a titanium dioxide core (85 weight percent) and a silica shell (15 weight percent), which shell is hydrophobically modified with 1,1,1-trimethyl-N-(trimethylsilyl)-silanamine, or hexamethyldisilazane.

Generally, the metal oxide core is selected in an amount of from about 50 to about 99 percent by weight, from about 65 to about 95 percent by weight, from about 80 to about 90 percent by weight, and yet more specifically, about 85 percent by weight, and the shell is present in an amount of from about 1 to about 50 percent by weight, from about 5 to about 35 percent by weight, and more specifically, about 15 percent by weight. The shell chemically treating component can be selected in various effective amounts, such as for example, from about 0.1 to about 40 percent by weight, from about 1 to about 30 percent by weight, or from about 10 to about 20 percent by weight. More specifically, the hydrophobic component used to chemically treat or add to the shell include, for example, silazanes, fluorosilanes and polysiloxanes, and which chemically treating agents are selected in an amount, for example, of from about 1 to about 15 weight percent, from about 1 to about 10 weight percent, from about 0.1 to about 12 weight percent, and other suitable amounts depending on the amounts selected for the shell. In embodiments, the core shell particle possesses a B.E.T. surface area of from about 10 to about 200 $m^2/g$, from about 30 to about 100 $m^2/g$, or from about 40 to about 70 $m^2/g$.

The core shell filler or component is present in an amount of, for example, from about 3 to about 60 weight percent, from about 1 to about 50 weight percent, or from about 20 to about 40 weight percent based on the intermediate transfer member components.

In embodiments, the core shell filler can be dispersed in a bisphenol-A-polycarbonate/methylene chloride ($CH_2Cl_2$) solution, and then the dispersion can be applied to or coated on a biaxially oriented poly(ethylene naphthalate) (PEN) substrate (KALEDEX™ 2000) having a thickness of, for example, about 3.5 mils using known draw bar coating methods. The resulting film or films can be dried at high temperatures, such as from about 100° C. to about 200° C., or from about 120° C. to about 160° C. for a sufficient period of time, such as for example, from about 1 to about 30 minutes, or from about 5 to about 15 minutes while remaining on the PEN substrate. After drying and cooling to room temperature, about 23° C. to about 25° C., the film or films on the PEN substrate or separate PEN substrates are automatically released from the substrate resulting in the functional intermediate transfer member or members as disclosed herein.

The core shell product component of the present disclosure is usually formed into a dispersion with a number of materials, such as a polyamic acid solution, and a polyimide precursor. With moderate mechanical stirring, uniform dispersions can be obtained, and then coated on glass plates using draw bar coating methods. The resulting films can be dried by heating at, for example, from about 100° C. to about 400° C. for about 20 to about 180 minutes while the films remain on the glass plate. After drying and cooling to room temperature, the film on the glass are immersed into water overnight, about 18 to 23 hours, and subsequently, the about 50 to about 150 microns thick films can be released from the glass to form functional intermediate transfer members.

Examples of suitable polyamic acid solutions (polyimide precursors) selected for dispersing the core shell include low temperature and rapidly cured polyimide polymers, such as VTEC™ PI 1388, 080-051, 851, 302, 203, 201 and PETI-5™, all available from Richard Blaine International, Incorporated, Reading, Pa. The thermosetting polyimides are cured at low temperatures, and more specifically, from about 180° C. to about 260° C. over a short period of time, such as from about 10 to about 120 minutes, or from about 20 to about 60 minutes; possess a number average molecular weight of, for example, from about 5,000 to about 500,000, or from about 10,000 to about 100,000, and a weight average molecular weight of, for example, from about 50,000 to about 5,000,000, or from about 100,000 to about 1,000,000. Thermosetting polyimide precursors that are cured at higher temperatures (above 300° C.) than the VTEC™ PI polyimide precursors, and that can be selected include PYRE-M.L.® RC-5019, RC-5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100 commercially available from FUJIFILM Electronic Materials U.S.A., Inc., North Kingstown, R.I.; and KAPTON® HN, VN and FN, all commercially available from E.I. DuPont, Wilmington, Del.

The core shell of the present disclosure can also be incorporated into thermoplastic materials such as a polyimide, a polyaramide, a polyphthalamide, a fluorinated polyimide, a polyimidesulfone polycarbonate, a polyamideimide (PAI), a polysulfone, a polyetherimide, a poly(ethylene terephthalate) (PET), a poly(ethylene naphthalate) (PEN), a poly(butylene terephthalate) (PBT), a polyvinylidene fluoride (PVDF), a polyethylene-co-polytetrafluoroethylene, and/or blends thereof.

The polyimides selected may be synthesized from prepolymer solutions, such as polyamic acid or esters of polyamic acid, or by the reaction of a dianhydride and a diamine. Suitable dianhydrides include aromatic dianhydrides and aromatic tetracarboxylic acid dianhydrides such as, for example, 9,9-bis(trifluoromethyl)xanthene-2,3,6,7-tetracarboxylic acid dianhydride, 2,2-bis-(3,4-dicarboxyphenyl)-hexafluoropropane dianhydride, 2,2-bis((3,4-dicarboxyphenoxy)phenyl)-hexafluoropropane dianhydride, 4,4'-bis(3,4-dicarboxy-2,5,6-trifluorophenoxy)octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy)phenyl)-ether dianhydride, di-(4-(3,4-dicarboxyphenoxy)phenyl)-sulfide dianhydride, di-(3,4-dicarboxyphenyl)methane dianhydride, di-(3,4-dicarboxyphenyl)-ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)-propane dianhydride, bis(3,4-dicarboxyphenyl)ether dianhydride, bis(2,3-dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)-diphthalic dianhydride, 4,4'-(m-phenylenedioxy)diphthalic dianhydride, 4,4'-diphenylsulfidedioxybis(4-phthalic acid) dianhydride, 4,4'-diphenylsulfonedioxybis(4-phthalic acid)dianhydride, methylenebis(4-phenyleneoxy-4-phthalic acid)dianhydride, ethylidenebis(4-phenyleneoxy-4-phthalic acid)dianhydride, isopropylidenebis(4-phenyleneoxy-4-phthalic acid)dianhydride, hexafluoroisopropylidenebis(4-phenyleneoxy-4-phthalic acid)dianhydride, and the like. Exemplary diamines suitable for use in the preparation of the polyimide include aromatic diamines such as 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3,-bis-(gamma-aminopropyl)-tetramethyl-disiloxane, 1,6-diaminohexane, 4,4'-diaminodiphenylmethane, 3,3'-diaminodiphenylmethane, 1,3,-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluoro-biphenyl, 4,4'-diamino-2,2',3,3',5,5', 6,6'-octafluorodiphenyl ether, bis[4-(3-aminophenoxy)-phenyl]sulfide, bis[4-(3-aminophenoxy)phenyl]sulfone, bis[4-(3-aminophenoxy)phenyl] ketone, 4,4'-bis(3-aminophenoxy)biphenyl, 2,2-bis[4-(3-aminophenoxy)phenyl]propane, 2,2-bis[4-(3-aminophenoxy)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, and 2,2-di(p-aminophenyl)-1,1,1,3,3,3-hexafluoropropane. The dianhydrides and diamines are usually selected in a weight ratio of dianhydride to diamine of from about 20:80 to about 80:20, or about 50:50 weight ratio.

In embodiments, the polyimide can be prepared from a dianhydride and a diamine suspended or dissolved in an organic solvent such as a mixture or separately, and reacted to form the polyamic acid, which is thermally or chemically dehydrated; and subsequently, the product is separated and purified. The polyimide is heat melted with a known extruder, delivered in the form of a film from a die having a slit nozzle, and a static charge is applied to the film; the film is cooled and solidified with a cooling roller having a surface temperature in the range of glass transition temperature ($T_g$) of the polymer ($T_g$)-50° C. to ($T_g$)-15° C., transmitted under tension without bringing the film into contact with rollers while further cooling to the room temperature, and wound up or transferred to a further step.

A number of the polyimides selected can be prepared as fully imidized polymers, which are substantially free of "amic" acid, and do not require a high temperature cure for conversion to the imide form. A typical polyimide of this type may be prepared by reacting di-(2,3-dicarboxyphenyl)-ether dianhydride with 5-amino-1-(p-aminophenyl)-1,3,3-trimethylindane. This polymer is available as Polyimide XU 218 sold by Ciba-Geigy Corporation, Ardsley, N.Y. Several fully imidized polyimides are available from USA Lenzing Corporation in Dallas, Tex., and are sold as Lenzing P83 polyimide, and by Mitsui Toatsu Chemicals, New York, N.Y. sold as Larc-TPI.

Examples of specific selected thermoplastic polyimide binders are KAPTON® KJ, commercially available from E.I. DuPont, Wilmington, Del., as represented by

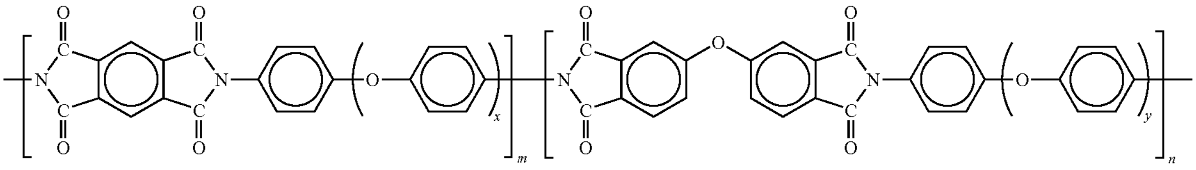

wherein x is equal to 2; y is equal to 2; m and n are from about 10 to about 300; and IMIDEX®, commercially available from West Lake Plastic Company, as represented by

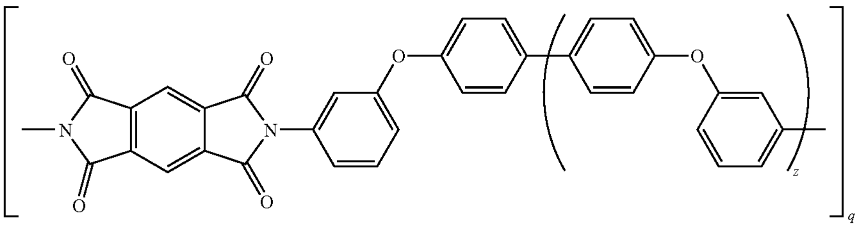

wherein z is equal to 1, and q is from about 10 to about 300.

Examples of polycarbonate binders selected include poly(4,4'-isopropylidene-diphenylene)carbonate (also referred to as bisphenol-A-polycarbonate), poly(4,4'-cyclohexylidine diphenylene)carbonate (also referred to as bisphenol-Z-polycarbonate), poly(4,4'-isopropylidene-3,3'-dimethyl-diphenyl) carbonate (also referred to as bisphenol-C-polycarbonate), and the like. In embodiments, the intermediate transfer member binders are comprised of bisphenol-A-polycarbonate resins, commercially available as MAKROLON®, with, for example, a weight average molecular weight of from about 50,000 to about 500,000.

Examples of additional components present in the intermediate transfer member are a number of known conductive components present, for example, in an amount of from about 3 to about 20 weight percent such as polyaniline and carbon black. In embodiments, the polyaniline component has a relatively small particle size of, for example, from about 0.5 to about 5, from about 1.1 to about 2.3, from about 1.2 to about 2, from about 1.5 to about 1.9, or about 1.7 microns.

Specific examples of polyanilines selected for the transfer member, such as an ITB, are PANIPOL™ F, commercially available from Panipol Oy, Finland; and lignosulfonic acid grafted polyanilines.

Examples of the intermediate transfer member carbon blacks include VULCAN® carbon blacks, REGAL® carbon blacks, and BLACK PEARLS® carbon blacks available from Cabot Corporation. Specific examples of conductive carbon blacks are BLACK PEARLS® 1000 (B.E.T. surface area=343 $m^2/g$, DBP absorption=105 ml/g), BLACK PEARLS® 880 (B.E.T. surface area=240 $m^2/g$, DBP absorption=106 ml/g), BLACK PEARLS® 800 (B.E.T. surface area=230 $m^2/g$, DBP absorption=68 ml/g), BLACK PEARLS® L (B.E.T. surface area=138 $m^2/g$, DBP absorption=61 ml/g), BLACK PEARLS® 570 (B.E.T. surface area=110 $m^2/g$, DBP absorption=114 ml/g), BLACK PEARLS® 170 (B.E.T. surface area=35 $m^2/g$, DBP absorption=122 ml/g), VULCAN® XC72 (B.E.T. surface area=254 $m^2/g$, DBP absorption=176 ml/g), VULCAN® XC72R (fluffy form of VULCAN® XC72), VULCAN® XC605, VULCAN® XC305, REGAL® 660 (B.E.T. surface area=112 $m^2/g$, DBP absorption=59 ml/g), REGAL® 400 (B.E.T. surface area=96 $m^2/g$, DBP absorption=69 ml/g), and REGAL® 330 (B.E.T. surface area=94 $m^2/g$, DBP absorption=71 ml/g). Dibutyl phthalate (DBP) absorption by the voids within carbon blacks are used to measure the structure of carbon black. The higher the structure, the more the voids, and the higher the DBP absorption.

In embodiments, a doped metal oxide refers, for example, to mixed metal oxides with at least two metals. Thus, for example, the antimony tin oxide comprises less than or equal to about 50 percent of antimony oxide, and the remainder is tin oxide; and a tin antimony oxide comprises less than or equal to about 50 percent of tin oxide, and the remainder is antimony oxide.

Generally, in embodiments the core antimony tin oxide can be represented by $Sb_xSn_yO_z$ wherein x is, for example, from about 0.02 to about 0.98, y is from about 0.51 to about 0.99, and z is from about 2.01 to about 2.49, and more specifically, wherein this oxide is comprised of from about 1 to about 49 percent of $Sb_2O_3$ and from about 51 to about 99 percent of $SnO_2$. In embodiments, x is from about 0.40 to about 0.90, y is from about 0.70 to about 0.95, and z is from about 2.10 to about 2.35; and more specifically, x is about 0.75, y is about 0.45, and z about 2.25; and wherein the core is comprised of from about 1 to about 49 percent of antimony oxide, and from about 51 to about 99 percent of tin oxide, from about 15 to about 35 percent of antimony oxide, and from about 85 to about 65 percent of tin oxide, and wherein the total thereof is about 100 percent; or from about 40 percent of antimony oxide, and about 60 percent of tin oxide, and wherein the total thereof is about 100 percent.

The surface resistivity of the intermediate transfer members disclosed herein is, for example, from about $10^9$ to about $10^{13}$ ohm/sq, or from about $10^{10}$ to about $10^{12}$ ohm/sq. The sheet resistivity of the intermediate transfer weldable members disclosure is, for example, from about $10^9$ to about $10^{13}$ ohm/sq, or from about $10^{10}$ to about $10^{12}$ ohm/sq.

The intermediate transfer member can be of any suitable configuration. Examples of suitable configurations include a sheet, a film, a web, a foil, a strip, a coil, a cylinder, a drum, an endless strip, a circular disc, a belt including an endless belt, and an endless seamed flexible belt. The circumference of the belt configuration for 1 to 2, or more layers is, for example, from about 250 to about 2,500 millimeters, from about 1,500 to about 2,500 millimeters, or from about 2,000 to about 2,200 millimeters. The width of the film or belt is, for example, from about 100 to about 1,000 millimeters, from about 200 to about 500 millimeters, or from about 300 to about 400 millimeters.

The intermediate transfer members illustrated herein, like intermediate transfer belts, can be selected for a number of printing and copying systems, inclusive of xerographic printing. For example, the disclosed intermediate transfer members can be incorporated into a multi-imaging system where each image being transferred is formed on the imaging or photoconductive drum at an image forming station, wherein each of these images is then developed at a developing station, and transferred to the intermediate transfer member. The images may be formed on the photoconductor and developed sequentially, and then transferred to the intermediate transfer member. In an alternative method, each image may be formed on the photoconductor or photoreceptor drum, developed, and transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

The intermediate transfer member present in the imaging systems illustrated herein, and other known imaging and printing systems, may be in the configuration of a sheet, a web, a belt, including an endless belt, an endless seamed flexible belt, and an endless seamed flexible belt; a roller, a film, a foil, a strip, a coil, a cylinder, a drum, an endless strip, and a circular disc. The intermediate transfer member can be comprised of a single layer or it can be comprised of several layers, such as from about 2 to about 5 layers. In embodiments, the intermediate transfer member further includes an outer release layer.

Release layer examples situated on and in contact with the core shell in the form of layer include low surface energy materials such as TEFLON®-like materials including fluorinated ethylene propylene copolymer (FEP), polytetrafluoroethylene (PTFE), polyfluoroalkoxy polytetrafluoroethylene (PFA TEFLON®), and other TEFLON®-like materials; silicone materials such as fluorosilicones, and silicone rubbers such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture, with a molecular weight $M_w$ of approximately 3,500); and fluoroelastomers such as those sold as VITON®, such as copolymers and terpolymers of vinylidenefluoride, hexafluoropropylene and tetrafluoroethylene, which are known commercially under various designations as VITON® A, VITON® E, VITON® E60C, VITON® E45, VITON® E430, VITON® B910, VITON®

GH VITON® B50, VITON® E45, and VITON® GF. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON® A; (2) a class of terpolymers of vinylidenefluoride, hexafluoropropylene, and tetrafluoroethylene known commercially as VITON® B; and (3) a class of tetrapolymers of vinylidenefluoride, hexafluoropropylene, tetrafluoroethylene, and a cure site monomer, such as VITON® GF, having 35 mole percent of vinylidenefluoride, 34 mole percent of hexafluoropropylene, and 29 mole percent of tetrafluoroethylene with 2 percent cure site monomer. Cure site monomer examples are available from E.I. DuPont de Nemours, Inc., such as 4-bromoperfluorobutene-1; 1,1-dihydro-4-bromoperfluorobutene-1; 3-bromoperfluoropropene-1; 1,1-dihydro-3-bromoperfluoropropene-1; or any other suitable, known, commercially available cure site monomers.

Specific embodiments will now be described in detail. These examples are intended to be illustrative, and the disclosure is not limited to the materials, conditions, or process parameters set forth in these embodiments. All parts are percentages by weight of total solids unless otherwise indicated.

Example I

Two grams of the core-shell filler VP STX801 (B.E.T. surface area equal to about 40 to 70 $m^2/g$, comprising a titanium dioxide core (85 percent) and a silica shell (15 percent), which shell is hydrophobically modified with and including 1,1,1-trimethyl-N-(trimethylsilyl)-silanamine), commercially available from EVONIK Industries, was mixed with eight grams of a bisphenol-A-polycarbonate, MAKROLON® 5705, having a molecular weight average of from about 50,000 to about 100,000, commercially available from Farbenfabriken Bayer A.G., and 100 grams of methylene chloride. By ball milling this mixture with 2 millimeters of stainless shot overnight, 23 hours, a uniform dispersion was obtained. The dispersion was then coated on a biaxially oriented poly(ethylene naphthalate) (PEN) substrate (KALEDEX™ 2000) having a thickness of 3.5 mils using known draw bar coating methods. The resulting film was dried at about 120° C. for 1 minute while remaining on the PEN substrate. After drying and cooling to room temperature, the film on the PEN substrate was automatically released from the substrate resulting in a 50 micron thick intermediate transfer member of a 1,1,1-trimethyl-N-(trimethylsilyl)-silanamine hydrophobized titanium droxide silica core shell filler/polycarbonate with a ratio by weight of 20/80.

Example II

Three grams of the core-shell filler VP STX801 (B.E.T. surface area equal to about 40 to 70 $m^2/g$, comprising a titanium dioxide core (85 percent) and a silica shell (15 percent), which shell is hydrophobically modified with 1,1,1-trimethyl-N-(trimethylsilyl)-silanamine), commercially available from EVONIK Industries was mixed with seven grams of a bisphenol-A-polycarbonate, MAKROLON® 5705, having a molecular weight average of from about 50,000 to about 100,000, commercially available from Farbenfabriken Bayer A.G., and 100 grams of methylene chloride. By ball milling this mixture with 2 millimeters of stainless shot overnight, 23 hours, a uniform dispersion was obtained. The resulting dispersion was then coated on a biaxially oriented poly(ethylene naphthalate) (PEN) substrate (KALEDEX™ 2000) having a thickness of 3.5 mils using known draw bar coating methods. The resulting film was dried at about 120° C. for 1 minute while remaining on the PEN substrate. After drying and cooling to room temperature, the film on the PEN substrate was automatically released from the substrate resulting in a 50 micron thick intermediate transfer member of 1,1,1-trimethyl-N-(trimethyl silyl) silanamine hydrophobized titanium dioxide core silica shell filler/polycarbonate with a ratio by weight of 30/70.

Example III

The process of Example II is repeated except in the place of the 1,1,1-trimethyl-N-(trimethylsilyl)-silanamine there is selected a silazane of 2,2,4,4,6,6-hexamethylcyclotrisilazane, 1,3-diethyl-1,1,3,3-tetramethyldisilazane, 1,1,3,3-tetramethyl-1,3-diphenyldisilazane, or 1,3-dimethyl-1,1,3,3-tetraphenyldisilazane, the fluorosilane of $C_6F_{13}CH_2CH_2OSi(OCH_3)_3$, or $C_8H_{17}CH_2CH_2OSi(OC_2H_5)_3$, or the polysiloxane of 2,4,6,8-tetramethylcyclotetrasiloxane, 2,4,6,8,10-pentamethylcyclopentasiloxane, octamethylcyclotetrasiloxane, decamethylcyclopentasiloxane, 2,4,6-trimethyl-2,4,6-triphenylcyclotrisiloxane, hexaphenylcyclotrisiloxane, or octaphenylcyclotetrasiloxane.

Example IV

The process of Example I is repeated except in the place of the titanium dioxide core there is selected the metal oxide of zinc oxide, tin oxide, aluminum doped zinc oxide, antimony doped titanium dioxide, antimony doped tin oxide, indium oxide, or indium tin oxide.

Comparative Example 1

Three grams of a titanium dioxide, MT-150AW (B.E.T. surface area equal to about 50 $m^2/g$, no surface treatment), commercially available from Tayca, Japan was mixed with seven grams of a bisphenol-A-polycarbonate, MAKROLON® 5705, having a molecular weight average of from about 50,000 to about 100,000, commercially available from Farbenfabriken Bayer A.G., and 100 grams of methylene chloride. By ball milling this mixture with 2 millimeters of stainless shot overnight, 23 hours, a uniform dispersion was obtained. The resulting dispersion was then coated on a biaxially oriented poly(ethylene naphthalate) (PEN) substrate (KALEDEX™ 2000) having a thickness of 3.5 mils using known draw bar coating methods. The resulting film was dried at about 120° C. for 1 minute while remaining on the PEN substrate. After drying and cooling to room temperature, the film on the PEN substrate was automatically released from the substrate resulting in a 50 micron thick intermediate transfer member of titanium dioxide/polycarbonate with a ratio by weight of 30/70.

Surface Resistivity Measurement

The above ITB members or devices of Comparative Example 1, and Examples I and II were measured after one day (about 24 hours) for surface resistivity (averaging four to six measurements at varying spots, 72° F./65 percent room humidity) using a High Resistivity Meter (Hiresta-Up MCP-HT450 from Mitsubishi Chemical Corp.). Then, the ITB devices of Comparative Example 1 and Example II were acclimated in A zone (80° F./80 percent humidity) for an aging study, and the surface resistivity was measured again at 2 months. The results are provided in Table 1.

TABLE 1

| | Surface Resistivity After 1 Day (ohm/sq) | Surface Resistivity After 2 Months in A Zone (ohm/sq) |
|---|---|---|
| Comparative Example 1 | $(4.21 \pm 0.32) \times 10^{11}$ | $(1.69 \pm 0.17) \times 10^{10}$ |
| Example I | $(1.58 \pm 0.15) \times 10^{13}$ | Not available |
| Example II | $(3.37 \pm 0.07) \times 10^{11}$ | $(8.78 \pm 0.13) \times 10^{10}$ |

Functional ITB devices (Examples I and II) were obtained, and the resistivity of the ITB decreasing with increasing core shell filler loading. When compared with the Comparative Example 1 ITB device comprising 30 weight percent of a titanium dioxide, the Example II ITB device comprising 30 weight percent of a hydrophobized silica/titanium dioxide core shell filler exhibited comparable resistivity at Day 1.

After 2 month aging in A zone, a stressful environment for ITB aging, the surface resistivity of the disclosed ITB device (Example II with 2 month aging in A zone) was reduced by 0.59 order of magnitude, while that of the Comparative Example 1 ITB device with 2 month aging in A zone was reduced by 1.4 orders of magnitude. The disclosed ITB device was electrically more stable with accelerated aging primarily because of the water repelling characteristics of the hydrophobized core shell filler.

Contact Angle Measurement

The advancing contact angles of water (in deionized water) of the ITB devices of Comparative Example 1 and Example II were measured at ambient temperature (about 23° C.) using the Contact Angle System OCA (Dataphysics Instruments GmbH, model OCA15. At least ten measurements were performed, and their averages are reported in Table 2.

TABLE 2

| | Contact Angle |
|---|---|
| Comparative Example 1 | 76° |
| Example II | 96° |

The disclosed Example III ITB device exhibited a 20° less contact angle than the Comparative Example 1 ITB device, which lower contact angle will, it is believed, improve toner transfer and cleaning as compared to Comparative Example 1.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer belt that is connected to a photoconductor, wherein said intermediate transfer belt consists of a substrate consisting of a conductive component, a polymer binder and a core shell component, wherein said conductive component and said core shell component are dispersed in said polymer binder, wherein said core consists of a metal oxide and said shell consists of silica and a trialkyl-N-(trialkylsilyl)-silanamine, and wherein said belt accepts a xerographic developed image from said photoconductor and thereafter said image is transferred to a document.

2. An intermediate transfer belt in accordance with claim 1 wherein said trialkyl-N-(trialkylsilyl)-silanamine is 1,1,1-trimethyl-N-(trimethylsilyl)-silanamine.

3. An intermediate transfer belt in accordance with claim 1 wherein said metal oxide is titanium oxide, tin oxide, antimony titanium dioxide, antimony tin oxide, indium oxide, indium tin oxide, or mixtures thereof.

4. An intermediate transfer belt in accordance with claim 1 wherein said metal oxide is titanium oxide, and wherein said trialkyl-N-(trialkylsilyl)-silanamine is 1,1,1-trimethyl-N-(trimethylsilyl).

5. An intermediate transfer belt in accordance with claim 1 wherein said trialkyl-N-(trialkylsilyl)-silanamine is selected from a group consisting of hexamethyldisalazane, 2,2,4,4,6,6-hexamethylcyclotrisilazane, 1,3-diethyl-1,1,3,3-tetramethyldisilazane, 1,1,3,3-tetramethyl-1,3-diphenyldisilazane, 1,3-dimethyl-1,1,3,3-tetraphenyul disilazane, and mixtures thereof.

6. An intermediate transfer belt in accordance with claim 1 wherein said core shell component possesses a B.E.T surface area of from about 10 to about 200 $m^2/g$.

7. An intermediate transfer belt in accordance with claim 1 wherein said core shell component possesses a B.E.T. surface area of from about 30 to 100 $m^2/g$.

8. An intermediate transfer belt in accordance with claim 1 wherein said core shell component is present in an amount of from about 1 to about 60 percent by weight based on the weight of total solids.

9. An intermediate transfer belt in accordance with claim 8 wherein said core shell component is present in an amount of from about 10 to about 40 percent by weight based on the weight of total solids.

10. An intermediate transfer belt in accordance with claim 1 wherein said belt is weldable.

11. An intermediate transfer belt in accordance with claim 1 wherein said conductive component is a polyaniline, a carbon black, or mixtures thereof.

12. An intermediate transfer belt in accordance with claim 11 wherein said conductive component is present in an amount of from about 3 to about 15 percent by weight based on the weight of total solids.

13. An intermediate transfer belt in accordance with claim 1 wherein said belt has a surface resistivity of from about $10^9$ to about $10^{13}$ ohm/sq.

14. An intermediate transfer belt in accordance with claim 13 wherein said surface resistivity is from about $10^{11}$ to about $10^{13}$ ohm/sq.

15. An intermediate transfer belt in accordance with claim 1 wherein said intermediate transfer belt has a circumference of from about 250 to about 2,500 millimeters.

16. An intermediate transfer belt in accordance with claim 1 wherein said polymer binder is selected from the group consisting of a polyimide, a polycarbonate, a polyester, a polyvinylidene fluoride, a polysulfone, a polyamide, a polyetherimide, a polyamideimide, a polyethylene-co-polytetrafluoroethylene, and mixtures thereof.

17. An intermediate transfer belt in accordance with claim 1 where said core is a antimony tin oxide represented by $Sb_xSn_yO_z$, wherein x is from about 0.02 to about 0.98, y is from about 0.51 to about 0.99, and z is from about 2.01 to about 2.49.

18. An intermediate transfer belt in accordance with claim 1 where said core is an antimony tin oxide represented by $Sb_xSn_yO_z$, wherein x is from about 0.40 to about 0.90, y is from about 0.70 to about 0.95, and z is from about 2.10 to about 2.35, and said trialkyl-N-(trialkylsilyl)-silanamine is 1,1,1-trimethyl-N-(trimethylsilyl)-silanamine treated silica.

19. An intermediate transfer belt in accordance with claim 1 wherein said trialkyl-N-(trialkylsilyl)-silanamine is hexamethyldisilazane present in an amount of from about 1 to about 20 weight percent of said core shell component.

20. An intermediate transfer member that is connected to a photoconductor, wherein said intermediate transfer member consists of a mixture of a polymer binder, a conductive carbon black component, a metal oxide core and over said metal core, wherein said conductive component and said core and said shell are dispersed in said polymer binder, wherein the material of said metal oxide core is selected from the group consisting of titanium oxide, tin oxide, antimony titanium dioxide, antimony tin oxide, indium oxide, indium tin oxide, and mixtures thereof, and wherein said shell consists of silica and a trialkyl-N-(trialkylsilyl)-silanamine selected from the group consisting of hexamethyldisilazane, 2,2,4,4,6,6-hexamethylcyclotrisilazane, 1,3-diethyl-1,1,3,3-tetramethyldisilazane, 1,1,3,3-tetramethyl-1,3-diphenyldisilazane, and 1,3-dimethyl-1,1,3,3-tetraphenyldisilazane and wherein said member accepts a xerographic developed image from said photoconductor and thereafter said image is transferred to a document.

* * * * *